United States Patent
Alvi et al.

(10) Patent No.: US 12,447,833 B2
(45) Date of Patent: Oct. 21, 2025

(54) MULTILEVEL INVERTER CURRENT SENSING

(71) Applicant: GM Global Technology Operations LLC, Detroit, MI (US)

(72) Inventors: Muhammad Hussain Alvi, Troy, MI (US); Chandra S. Namuduri, Troy, MI (US); Junghoon Kim, Ann Arbor, MI (US); Yilun Luo, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 212 days.

(21) Appl. No.: 18/352,469

(22) Filed: Jul. 14, 2023

(65) Prior Publication Data

US 2025/0018808 A1    Jan. 16, 2025

(51) Int. Cl.
  *B60L 50/51*    (2019.01)
  *H02M 1/00*    (2007.01)
  *H02M 7/483*    (2007.01)
  *H02M 7/487*    (2007.01)

(52) U.S. Cl.
  CPC ......... *B60L 50/51* (2019.02); *H02M 1/0009* (2021.05); *H02M 7/4835* (2021.05); *H02M 7/487* (2013.01); *B60L 2210/42* (2013.01); *B60L 2240/429* (2013.01)

(58) Field of Classification Search
  CPC ............ B60L 50/51; B60L 2210/42; B60L 2240/429; H02M 1/0009; H02M 7/4835; H02M 7/487; H02M 7/5387; H02M 7/003; H02M 7/49; H02M 7/5395; H02P 27/06

USPC ....... 320/107, 108, 109, 128, 132, 134, 136, 320/137; 363/17, 37, 98, 132, 21.01, 363/131, 71, 282; 323/282; 307/9.1
  See application file for complete search history.

(56) References Cited

FOREIGN PATENT DOCUMENTS

DE    102015219364 A1 *    4/2016    ........... G01R 15/202
DE    102021208720 A1    2/2023

OTHER PUBLICATIONS

Chunyang et al, A Novel five phase current reconstruction technique fed by dual inverter, Dec. 24, 2020 (Year: 2020).*
Alvi et al.; Power Module Design for Integrated Three-Phase Current Sensing Using a Single 3-D Point Field Detector; EEE Energy Conversion Congress and Exposition; 2020; 11 pages.
German Office Action for German Application No. 102023127389.2; dated Aug. 20, 2024; 5 pages.
Jiang et al.; A Novel five phase current reconstruction technique fed by dual inverter; International Conference on Electrical Engineering and Control Technologies; IEEE; 2020; 7 pages.

* cited by examiner

*Primary Examiner* — Elim Ortiz
(74) *Attorney, Agent, or Firm* — CANTOR COLBURN LLP

(57)    ABSTRACT

A conversion system includes a conversion device including a multilevel inverter configured to generate two alternating current (AC) output currents, a current sensor configured to sample a current through the multilevel inverter, or from the multilevel inverter, during a switching cycle, and a processor configure to estimate both of the two AC output currents based on the sampled current from the current sensor.

20 Claims, 8 Drawing Sheets

MULTILEVEL INVERTER CURRENT SENSING

INTRODUCTION

The subject disclosure relates to inverters, and more particularly to systems and methods for transferring power using multilevel inverters.

Vehicles, including gasoline and diesel power vehicles, as well as electric and hybrid electric vehicles, feature battery energy storage for purposes such as powering electric motors, electronics and other vehicle subsystems. For example, electric vehicles typically include one or more battery assemblies connected to one or more electric motors for propulsion. Battery assemblies may also be used to supply power to other vehicle systems (e.g., power electronics, control modules, heating and cooling systems, etc.)

Vehicle inverters facilitate conversion of direct current (DC) power to alternating current (AC) power to drive motors using AC current. Inverters used in automotive applications are typically two-level inverters, although multilevel inverters are increasingly being used.

SUMMARY

In one exemplary embodiment, a conversion system includes a conversion device including a multilevel inverter configured to generate two alternating current (AC) output currents, a current sensor configured to sample a current through the multilevel inverter, or from the multilevel inverter, during a switching cycle, and a processor configure to estimate both of the two AC output currents based on the sampled current from the current sensor.

In addition to one or more of the features described herein, the current sensor is configured to sample the current during a switching cycle when zero voltage is output.

In addition to one or more of the features described herein, the current sensor is a two-dimensional magnetic field detector.

In addition to one or more of the features described herein, the multilevel inverter is a diode clamped inverter having a first set of switches connected by a first diode and a second set of switches connected by a second diode, and the current sensor is configured to simultaneously detect orthogonal magnetic fields due to a current flowing through the first diode and the second diode.

In addition to one or more of the features described the multilevel inverter has a full bridge topology connecting a first set of switches to a second set of switches, the first set of switches connected to the second set of switches by a bidirectional switch line.

In addition to one or more of the features described herein, the current sensor is disposed at the bidirectional switch line to detect a current through the bidirectional switch line.

In addition to one or more of the features described herein, the current sensor is a two-dimensional magnetic field sensor disposed at an orthogonal crossing between a branch of the full bridge topology and one of: the bidirectional switch line and a direct current (DC) bus.

In addition to one or more of the features described herein, the multilevel inverter is connected to a first output conductor configured to carry a first output current and a second output conductor configured to carry a second output current, and the current sensor, the first output conductor and the second output conductor are configured so that the current sensor detects a first magnetic field generated by the first output current and a second magnetic field generated by the second output current.

In another exemplary embodiment, a method of transferring electrical power includes receiving an input current from a direct current (DC) source at a conversion device including a multilevel inverter, and converting the input current by the multilevel inverter to generate two alternating current (AC) output currents, where the converting includes performing a series of switching cycles. The method also includes sampling a current through the multilevel inverter, or from the multilevel inverter, during a switching cycle by a single current sensor, and estimating both of the two AC output currents based on the sampled current from the single current sensor.

In addition to one or more of the features described herein, the sampling is performed during the switching cycle when zero voltage is output.

In addition to one or more of the features described herein, the multilevel inverter is a diode clamped inverter having a first set of switches connected by a first diode and a second set of switches connected by a second diode, and the single current sensor simultaneously detects orthogonal magnetic fields due to current flowing through the first diode and the second diode.

In addition to one or more of the features described herein, the estimating includes decoupling the orthogonal magnetic fields.

In addition to one or more of the features described herein, the multilevel inverter has a full bridge topology connecting a first set of switches to a second set of switches, the first set of switches connected to the second set of switches by a bidirectional switch line.

In addition to one or more of the features described herein, the single current sensor is disposed at the bidirectional switch line, and the sampling is performed during the switching cycle when a current is flowing through the bidirectional switch line.

In addition to one or more of the features described herein, the single current sensor is a two-dimensional magnetic field sensor disposed at an orthogonal crossing between a branch of the full bridge topology and one of: the bidirectional switch line and a DC bus, and the sampling is performed when a current is flowing through the orthogonal crossing.

In addition to one or more of the features described herein, the multilevel inverter is connected to a first output conductor configured to carry a first output current and a second output conductor configured to carry a second output current, and the sampling includes detecting a first magnetic field generated by the first output current and a second magnetic field generated by the second output current.

In yet another exemplary embodiment, a vehicle system includes a battery system, a conversion device connected to the battery system and including a multi-phase inverter module, the multi-phase inverter module including a multilevel inverter configured to output two alternating current (AC) output currents, and a processor configured to perform a method. The method includes converting an input current by the multilevel inverter to generate the two AC output currents, wherein the converting includes performing a series of switching cycles, sampling a current through the multilevel inverter, or from the multilevel inverter, during a switching cycle by a single current sensor, and estimating both of the two AC output currents based on the sampled current from the single current sensor.

In addition to one or more of the features described herein, the multilevel inverter is a diode clamped inverter having a first set of switches connected by a first diode and a second set of switches connected by a second diode, and the current sensor simultaneously detects orthogonal magnetic fields due to current flowing through the first diode and the second diode.

In addition to one or more of the features described herein, the multilevel inverter has a full bridge topology connecting a first set of switches to a second set of switches, the first set of switches connected to the second set of switches by a bidirectional switch line, the single current sensor is disposed at the bidirectional switch line, and the sampling is performed during the switching cycle when a current is flowing through the bidirectional switch line.

In addition to one or more of the features described herein, the multilevel inverter is connected to a first output conductor configured to carry a first output current and a second output conductor configured to carry a second output current, and the sampling includes detecting a first magnetic field generated by the first output current and a second magnetic field generated by the second output current.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
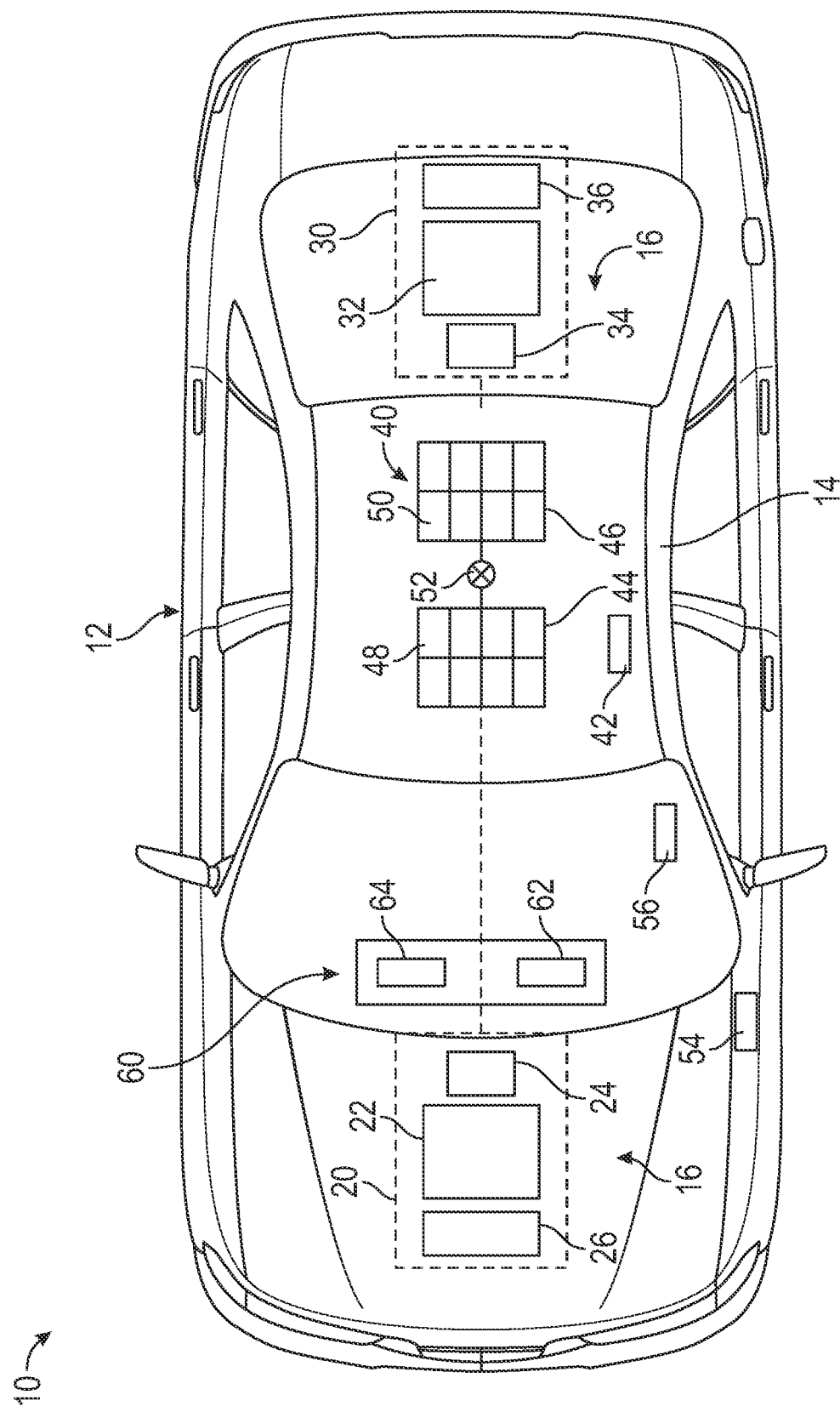
FIG. 1 is a top schematic view of a motor vehicle including a battery system and a charging system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods, devices and systems are provided for conversion and transfer of power between a battery system and loads using multilevel inverters. In an embodiment, a conversion system for an electric or hybrid vehicle includes a multi-phase converter including at least one dual output multilevel inverter. For example, the conversion system includes three multilevel inverters, in which each inverter outputs two phases (i.e., the conversion system is a six-phase system.

Each multilevel inverter includes a current sensor configured to simultaneously or concurrently (e.g., within the same switching cycle) measure the dual current outputs from an inverter. The current sensor may be disposed within an inverter circuit, or disposed proximate to output leads or conductors (busbars). For example, the current sensor is configured to detect current flowing through a neutral branch of the inverter.

In an embodiment, the current sensor is a two-dimensional magnetic field sensor disposed in the inverter circuit and configured to detect orthogonal magnetic fields from current flowing through orthogonal branches or lines. For example, the inverter is a diode clamped X-type inverter, and the current sensor is disposed proximate to orthogonal conductors connecting diodes to sets of switches in the inverter. In another example, the current sensor is disposed proximate to orthogonal conductors in the inverter, such as a crossing between a neutral branch and a phase branch of a full-bridge (H-type) inverter.

Embodiments also include methods of controlling a conversion device having a multilevel inverter. A method includes operating inverter switches according to a modulation scheme (e.g., pulse width modulation), and sampling currents or magnetic fields during one or more switching cycles. In an embodiment, sampling is performed during a switching cycle when the inverter is in a zero state (i.e., output voltage is zero).

Embodiments described herein present numerous advantages and technical effects. The embodiments reduce the complexity, number or components of dual output multilevel inverters by eliminating the need for a current sensor at each phase output of a conversion device. For example, a six-phase conversion device connected to an electric vehicle motor (three dual output multilevel inverters) would normally require six current sensors. Embodiments allow for use of the conversion device with only three current sensors.

The embodiments are not limited to use with any specific vehicle or device or system that utilizes battery assemblies, and may be applicable to various contexts. For example, embodiments may be used with automobiles, trucks, aircraft, construction equipment, farm equipment, automated factory equipment and/or any other device or system that may use high voltage battery packs or other battery assemblies.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and if the vehicle is a hybrid electric vehicle, a fuel injection subsystem, an exhaust subsystem and others.

The vehicle 10 may be an electrically powered vehicle (EV), a hybrid vehicle or any other vehicle having an electrical energy source. In an embodiment, the vehicle 10 is an electric vehicle, which includes one or more motors and one or more drive systems. For example, the propulsion system 16 is a multi-drive system that includes a first drive unit 20 and a second drive unit 30. The first drive unit 20 includes a first electric motor 22 and a first conversion device 24, as well as other components such as a cooling system 26. The second drive unit 30 includes a second electric motor 32 and a second conversion device 34, and other components such as a cooling system 36.

The conversion devices 24 and 34 (e.g., traction power inverter units or TPIMs) include inverters for converting direct current (DC) power from a high voltage (HV) battery system 40 to poly-phase (e.g., two-phase, three-phase, six-phase, etc.) alternating current (AC) power to drive the motors 22 and 32. For example, the conversion device 24 and/or the conversion device 34 includes at least one dual output multilevel inversion circuit (multilevel inverter).

As also shown in FIG. 1, the drive systems are configured such that the first electric motor 22 drives front wheels (not shown) and the second electric motor 32 drives rear wheels (not shown). However, embodiments are not so limited, as there may be any number of drive systems and/or motors at various locations (e.g., a motor driving each wheel, twin motors per axle, etc.). For example, the vehicle may have a single drive unit.

In the propulsion system 16, the drive unit 20 and the drive unit 30 are electrically connected to the battery system 40. The battery system 40 may also be electrically connected to other components, such as vehicle electronics (e.g., via an auxiliary power module or APM 42). The battery system 40 may be configured as a rechargeable energy storage system (RESS).

The battery system 40 includes one or more battery assemblies. For example, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the conversion device 24, and a second battery pack 46 connected to the conversion device 34. The battery pack 44 includes a plurality of battery modules 48, and the battery pack 46 includes a plurality of battery modules 50. Each module 48, 50 includes a number of individual cells (not shown).

The battery system 40 can be configured to provide different output voltage levels. For example, a battery switching device 52 is included for selectively connecting the battery pack 44 to the battery pack 46 in series to provide a relatively high voltage (e.g., 800V). The battery switching device 52 can also be operated to connect the battery packs in parallel to provide a relatively low voltage (e.g., 400 V).

The vehicle 10 also includes a charging system, which can be used to charge the battery system 40 and/or to supply power from the battery system 40 to charge another energy storage system (e.g., vehicle-to-vehicle (V2V) and/or vehicle-to-everything (V2X) charging). The charging system is connected to one or more charge ports 54 for charging from an energy storage system such as a utility AC power supply or from a DC fast charge (DCFC) station. The charging system is controllable by, for example, at least one onboard charging module (OBCM) 56 that is electrically connected to the charge port 54.

The vehicle 10 also includes a computer system 60 that includes one or more processing devices 62 and a user interface 64. The computer system 60 may communicate with the charging system controller, for example, to provide commands thereto in response to a user input. The various processing devices, modules and units may communicate with one another via a communication device or system, such as a controller area network (CAN) or transmission control protocol (TCP) bus.

As noted above, the vehicle 10 includes one or more multilevel inverters. A "multilevel inverter" is a type of inverter that is capable of outputting more than two voltage levels, and can generate a stepped current output that approximates a desired waveform having a desired amplitude, frequency and phase. Such inverters provide AC current outputs with lower voltage spikes and harmonic distortions than traditional two-level inverters. By producing more than two levels, a multilevel inverter can create smoother waveforms than two-level inverters.

In an embodiment, the multi-level inverters are clamped inverters, such as diode clamped inverters and full-bridge (H-type) inverters. However, embodiments may be applicable to various other multilevel inverter topologies (e.g., cascaded inverters, flying capacitor inverters, etc.). In addition, embodiments are not limited to three-level inverters, and may be applicable to other multilevel inverters (e.g., 5-level, 11-level etc.).

In an embodiment, each multi-level inverter is a dual output inverter. A "dual output" inverter refers to an inverter that outputs two separate currents. The output currents include a first AC current and a second AC current that are output simultaneously with the same magnitude and frequency, but separated in phase by 180 degrees. Thus, a three-phase dual output inverter outputs six AC phase currents. Each inverter includes a single current sensor that can sample currents and/or magnetic fields and measure both output currents.

Figure 2:
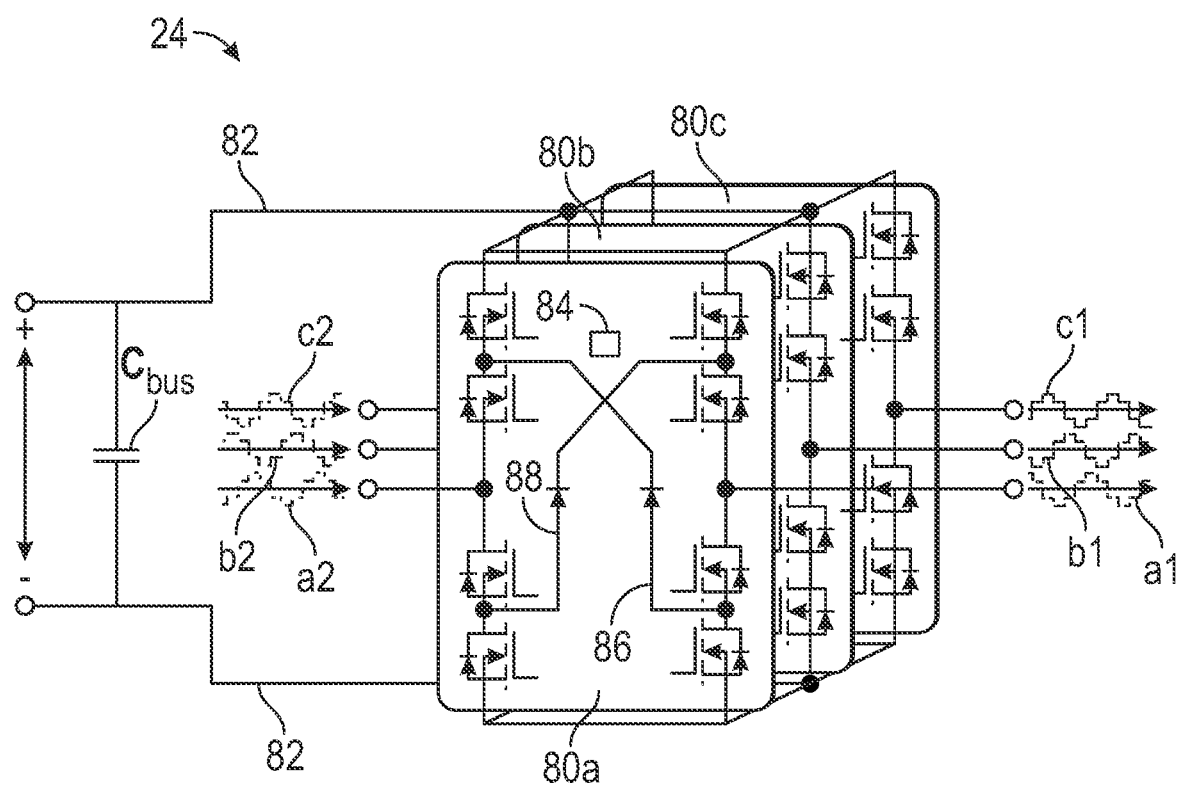
FIG. 2 depicts a conversion device including three dual output multilevel inverters, in accordance with an exemplary embodiment.
Figure 3:
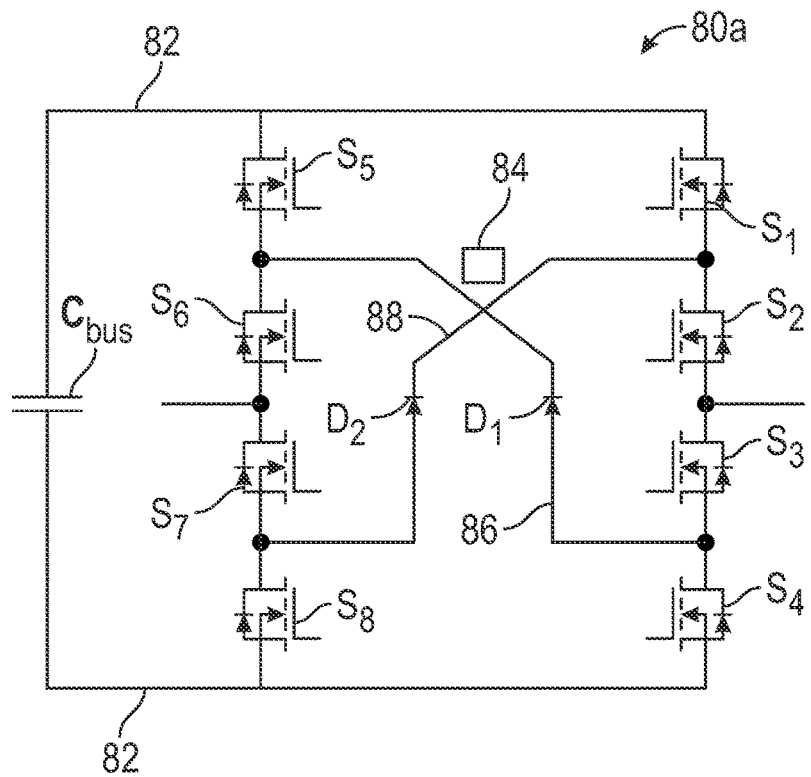
FIG. 3 depicts a multilevel inverter of the conversion device of FIG. 2, including a current sensor, in accordance with an exemplary embodiment.

FIGS. 2 and 3 depict an example of inversion circuits in a conversion device, such as the conversion device 24, which has three dual output three-level inverters. It is noted that although only the conversion device 24 is discussed, the conversion device 34 may be similarly configured. In addition, the embodiments discussed herein are not limited to the specific conversion devices and contexts described.

As shown in FIG. 2, the conversion device 24 includes three dual output inverters 80a, 80b and 80c, each having a multilevel inversion topology that generates two outputs, resulting in six phase signals (currents a1, a2, b1, b2, c1 and c2) that are transmitted via respective conductors (e.g., busbars) to a motor and/or other load(s). The inverters are connected in parallel to a DC bus 82 and a capacitor $C_{bus}$. Diodes are included and connected to switches in parallel to perform voltage clamping. The inverters in this embodiment are referred to as "X-type" inverters.

For example, as shown in FIG. 3, the inverter 80*a* includes phase branches for alternately generating positive and negative voltages, and neutral branches (zero) branches for generating zero voltage. Each phase branch is controlled via a modulation scheme to output a first phase current a1 (corresponding to a phase A1) and a second phase current a2 (corresponding to a second phase A2). One phase branch includes switches $S_1$, $S_2$, $S_7$ and $S_8$ connected by a neutral branch having a conductor 88 and a diode $D_2$. Another phase branch includes switches $S_3$, $S_4$, $S_5$ and $S_6$ connected by a neutral branch having a conductor 86 and a diode $D_1$.

Each inverter 80*a*, 80*b* and 80*c* includes a current sensor 84 configured to measure the output currents from each inverter. One current sensor 84 is disposed at each inverter, and positioned so that the current sensor 84 can measure both current outputs during a switching cycle.

Typically, a multilevel inverter such as the inverter 24 would have six current sensors (one current sensor for each output). This embodiment, and other embodiments described herein, allow for using only one sensor for each dual output inverter, thereby reducing the required number of current sensors by half.

In an embodiment, the current sensor 84 is two-dimensional (2D) magnetoresistive detector, such as a point field detector (PFD), configured to detect magnetic fields generated by current through an inverter. The PFD detector detects components of an induced magnetic field along an x-direction and a y-direction orthogonal to the x-direction.

The current sensor 84 is positioned so that magnetic field measurements can be translated into a current measurement. In an embodiment, the current sensor 84 is disposed proximate to the diodes $D_1$ and $D_2$ and/or the conductors 86 and 88. As described herein "proximate" refers to being close enough to capture orthogonal fields generated by dual currents flowing through the diodes $D_1$ and $D_2$.

For example, the current sensor 84 is disposed close enough to the X-crossing of the conductors 86 and 88, such that the current sensor 84 is disposed in magnetic fields produced as current conducts through the conductors 86 and 88. The magnetic fields are orthogonal (i.e., one field is oriented in an x-direction and another field is oriented in a y-direction that is orthogonal to the x-direction). These fields can be decoupled using the 2D field detector to allow for estimation of the current that is output as phases A1 and A2.

For example, the orthogonal fields are decoupled according to the following equation:

$$\begin{bmatrix} C_{xa} & C_{xb} \\ C_{ya} & C_{yb} \end{bmatrix} \begin{bmatrix} I_a \\ I_b \end{bmatrix} = \begin{bmatrix} VB_x \\ VB_y \end{bmatrix},$$

where $I_a$ is an output current corresponding to phase A1, and $I_b$ is an output current corresponding to phase A2. V is the output voltage, $VB_x$ is the voltage detected by the current sensor in the x-direction and $VB_y$ is the voltage detected by the current sensor in the y-direction. $C_{xa}$, $C_{ya}$ are coefficients related to the current $I_a$, and Cxb and $C_{yb}$ are coefficients related to the current $I_b$.

The current sensor 84 is configured to be controlled to sample current measurements (e.g., magnetic fields) at selected points during a switching cycle. As is known, switches of the phase branches are operated to produce AC currents based on a plurality of successive switching cycles. During a switching cycle, the inverter 80*a* is alternated between various switching states. In a first switching state, the phase A1 output voltage is positive (e.g., at a voltage of positive $V_{dc}/2$, where $V_{dc}$ is the input voltage from the battery system 40) and the phase A2 output is negative (e.g., at a voltage of negative $V_{dc}/2$ or $-V_{dc}/2$). In a second switching state, the phase A1 output voltage is negative (e.g., $-V_{dc}/2$) and the phase A2 output voltage is positive (e.g., $V_{dc}/2$). In a neutral switching state, the voltage output is zero.

In an embodiment, the current sensor 84 is sampled during a switching cycle during a zero voltage state. In the zero voltage state, the output voltage from each phase is zero (i.e., phases A1 and A2 are connected to create virtual zero).

Figure 4:
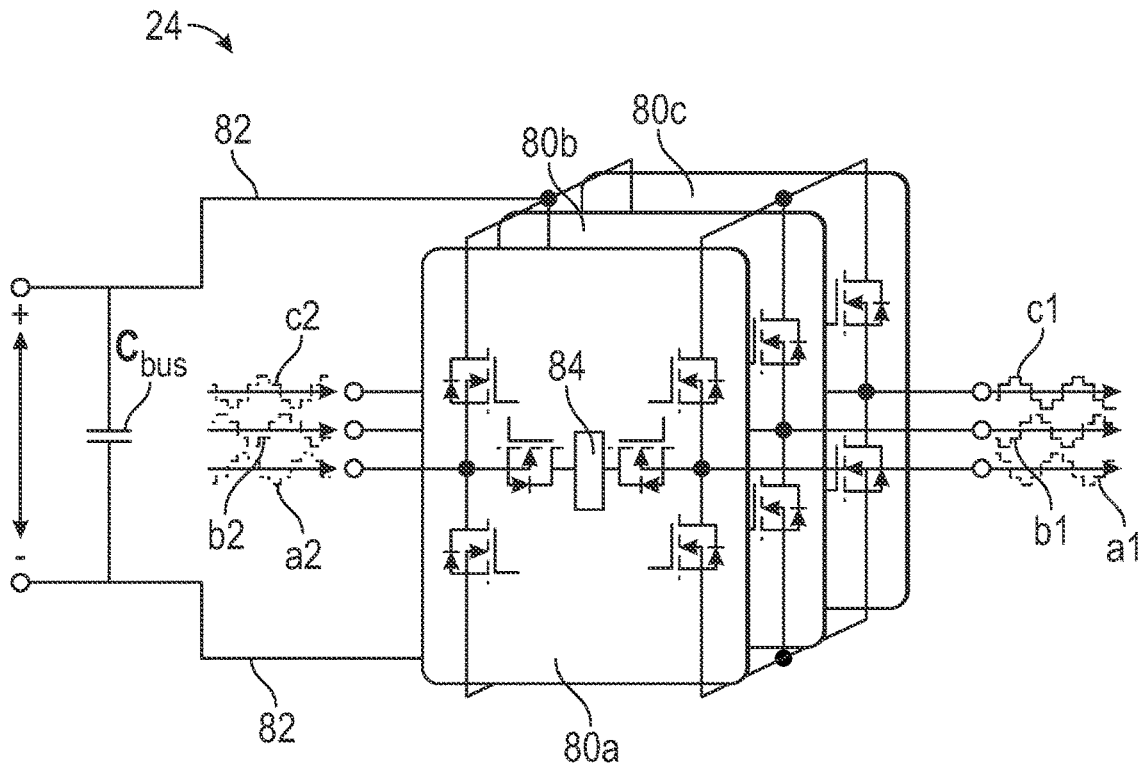
FIG. 4 depicts a conversion device including three dual output multilevel inverters, in accordance with an exemplary embodiment.

FIGS. 4-7 depict an example of inversion circuits in a conversion device, such as the conversion device 24, which has three dual output three-level inverters. As shown in FIG. 4, the conversion device 24 includes three dual output inverters 80*a*, 80*b* and 80*c*, each having a multilevel inversion topology with two outputs.

Figure 5:
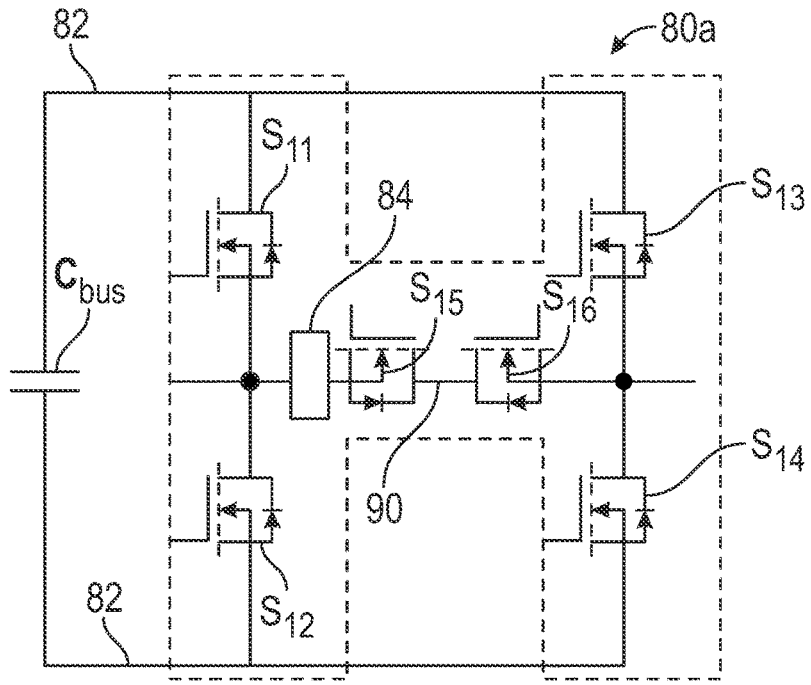
FIG. 5 depicts a multilevel inverter of the conversion device of FIG. 4, including a current sensor disposed at a neutral branch, in accordance with an exemplary embodiment.

Each inverter is a full-bridge ("H-type") multilevel converter that includes phase branches connected by a neutral branch. For example, as shown in FIG. 5, the inverter 80*a* includes phase branches that have phase branch switches $S_{11}$, $S_{12}$, $S_{13}$ and $S_{14}$. The phase branches are selectively connectable by a bi-directional neutral branch or switch line having a conductor 90 and neutral branch switches $S_{15}$ and $S_{16}$.

During a switching cycle, the inverter 80*a* transitions between various switching states. A first switching state is achieved by closing switches $S_{11}$ and $S_{14}$ to generate positive voltage at the A2 output and negative voltage at the A1 output, and a second switching state is achieved by closing switches $S_{12}$ and $S_{13}$ to generate negative voltage at the A2 output and positive voltage at the A1 output. A forward neutral state is provided by closing switch $S_{15}$ and opening all of the other switches, and a reverse neutral state is provided by closing the switch $S_{16}$.

In an embodiment, the current sensor 84 is disposed at the neutral branch and positioned to sample current when the inverter 80*a* is in a neutral state and current is flowing through the neutral branch (switch $S_{15}$ or $S_{16}$ is closed). The switch 84 may be positioned at any desired location, such as between the switches $S_{15}$ and $S_{16}$ as shown in FIG. 4, or between one of the switches and a connection between the neutral branch and a phase branch (e.g., as shown in FIG. 5).

Figure 6:
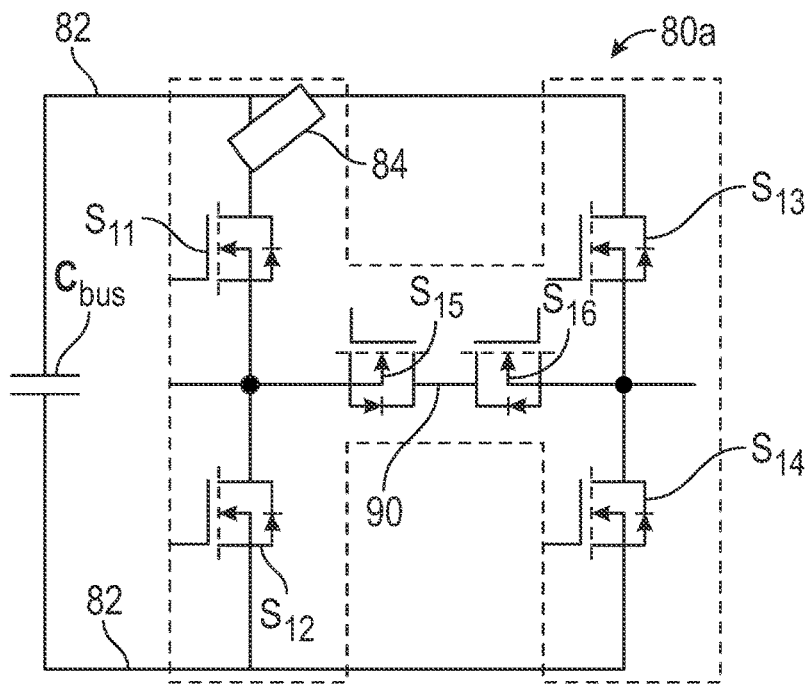
FIG. 6 depicts a multilevel inverter of the conversion device of FIG. 4, including a current sensor disposed at an orthogonal crossing between a phase branch and a bus, in accordance with an exemplary embodiment.
Figure 7:
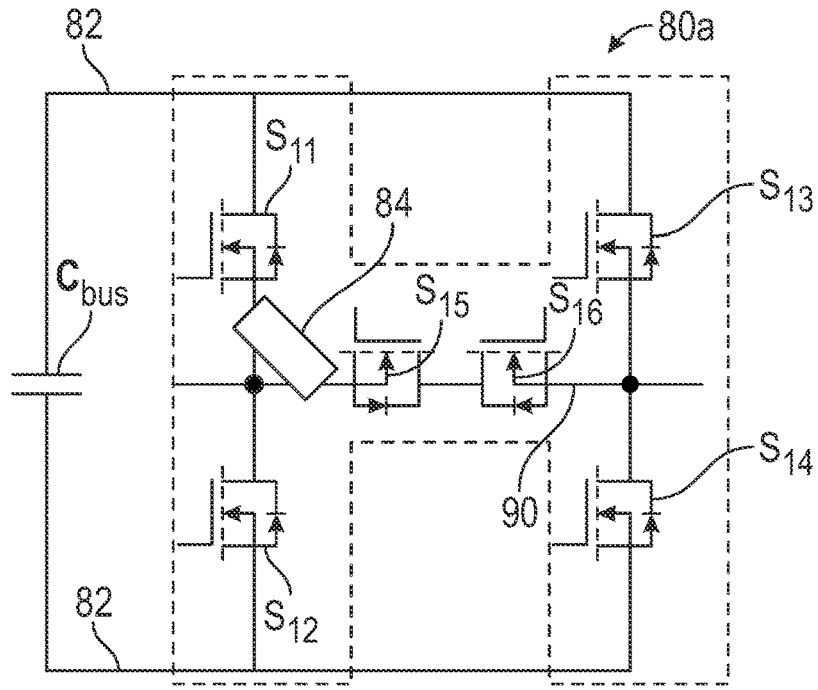
FIG. 7 depicts a multilevel inverter of the conversion device of FIG. 4, including a current sensor disposed at an orthogonal crossing between a phase branch and a neutral branch, in accordance with an exemplary embodiment.

FIGS. 6 and 7 show embodiments in which the current sensor 84 is a 2D magnetic field sensor (e.g., PFD) and is positioned proximate to an orthogonal crossing. The current sensor 84 is oriented so that its measurement dimensions cross both orthogonal fields. Determination of the output current is based on decoupling the magnetic fields as discussed herein.

For example, as shown in FIG. 6, the current sensor 84 is positioned proximate to an orthogonal crossing between one of the phase branches and the DC bus 82. The current sensor 84 may be positioned at the crossing as shown, or any of the other crossings between the DC bus and a phase branch. In another example, shown in FIG. 7, the current sensor 84 is positioned at a crossing between the neutral branch and one of the phase branches.

In an embodiment, a current sensor is disposed proximate to output conductors (e.g., busbars) that transmit phase currents from an inverter. The current sensor may be a PFD sensor or other suitable type of current sensor.

Figure 8:
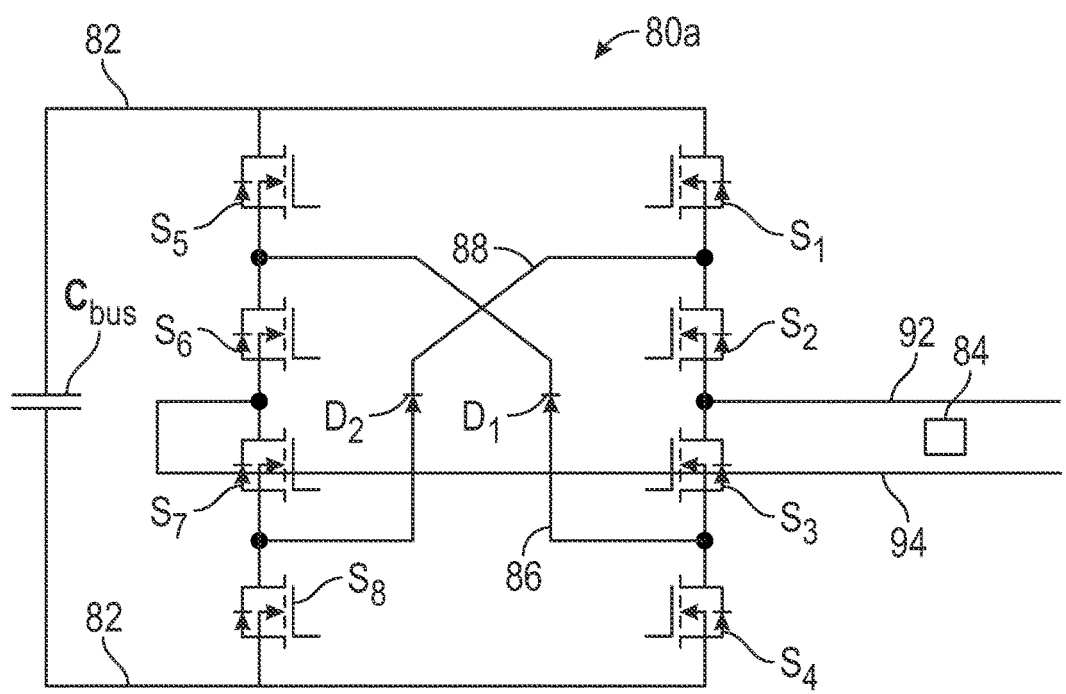
FIG. 8 depicts a multilevel inverter including a current sensor disposed proximate to conductors carrying output currents, in accordance with an exemplary embodiment.

FIG. 8 depicts an embodiment of the inverter 80*a* having a current sensor 84 disposed proximate to output conductors 92 and 94 (as referred to as "phase leads"). Each conductor 92 and 94 may be any form of conductor, such as a busbar. Although the inverter 80*a* is shown as an X-type inverter, the embodiment is applicable to other types of dual output multilevel inverters, such as H-type inverters.

The current sensor 84 is positioned relative to the phase leads 92 and 94, such that the sensor 84 is disposed within magnetic fields generated by phase currents (e.g., A1 and A2 phases) flowing through the phase leads. The phase leads are routed or positioned such that a magnetic field produced by the A1 phase current is orthogonal to a magnetic field produced by the A2 phase current. For example, the phase leads are configured so that the phase lead 92 is orthogonal to the phase lead 94, and the current sensor 84 is disposed proximate to the crossing.

In the embodiment of FIG. 8, the current sensor 84 is a 2D PFD sensor that detects both magnetic fields. Estimation of the output current is performed by decoupling the magnetic fields according to the following equation:

$$\begin{bmatrix} D_{x1} & D_{x2} \\ D_{y1} & D_{y2} \end{bmatrix} \begin{bmatrix} VB_x \\ VB_y \end{bmatrix} = \begin{bmatrix} I_A \\ I_B \end{bmatrix},$$

where $I_A$ is an output current through the phase lead 92, and $I_B$ is an output current through the phase lead 94. V is the output voltage, $VB_x$ is the voltage detected by the current sensor in the x-direction and $VB_y$ is the voltage detected by the current sensor-in the y-direction. $D_{x1}$ and $D_{y1}$ are coefficients related to the current $I_A$, and $D_{x2}$ and $D_{y2}$ are coefficients related to the current $I_B$.

Figure 9:
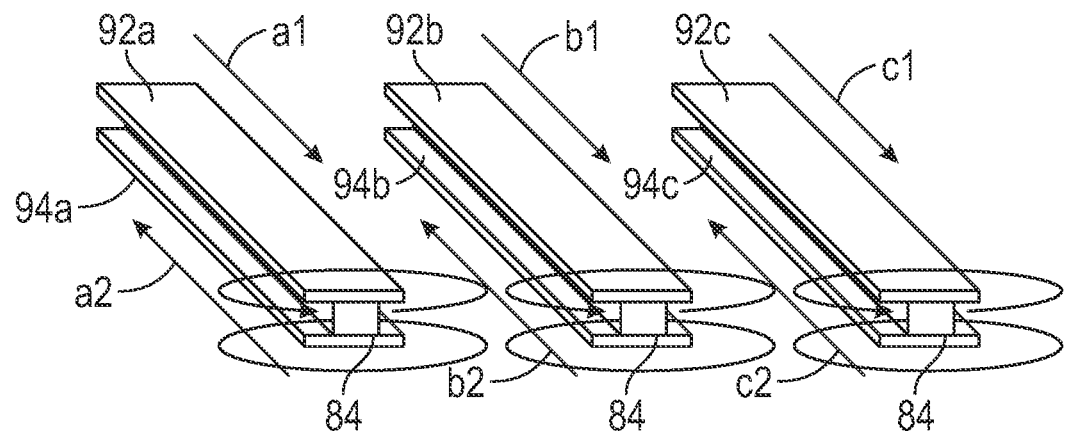
FIG. 9 depicts pairs of conductors configured to carry output currents from respective dual output multilevel inverters, including a current sensor disposed between each pair of conductors, in accordance with an exemplary embodiment.

In an embodiment, a current sensor is disposed between phase leads from a given inverter to sample output current. FIG. 9 depicts an example in which each inverter 80a, 80b and 80c has a pair of output conductors or phase leads that are positioned close enough to one another so that their respective magnetic fields combine. A current sensor 84 is disposed between the pair of phase leads from an inverter to detect the combined magnetic field, which corresponds to twice the current magnitude in each phase lead.

For example, as shown in FIG. 9, the conductors or phase leads from the inverter 80a are shown as a busbar 92a that carries the phase current a1 (phase A1) from one phase output, and a busbar 94a that carries the phase current a2 (phase A2). Busbars 92b and 94b carry phase current b1 and b2, respectively, from the inverter 80b. Busbars 92c and 94c carry phase current c1 and c2, respectively, from the inverter 80c.

The pairs of busbars are separated such that cross-talk or coupling between adjacent pairs (e.g., between the pair of busbars 92a, 94a and the pair of busbars 92b, 94b) is minimized. For example, the magnetic fields around each pair of busbars are closed, and the pairs are separated such that the closed fields do not interact.

To estimate an output current, the current sensor 84 samples the magnetic fields via a suitable type of current sensor 84 (e.g., Hall effect, magnetoresistive, etc.). Current through one of the busbars (e.g., 92a) is reversed relative to current through another busbar in the pair (e.g., 94a). The current sensor detects the combined magnetic field. As the currents have the same waveform but have inverse phases (separated by 180 degrees), the magnetic field strength is double that of either field. The detected magnetic field is translated to current, which represents twice the current magnitude in each busbar.

Figure 10:
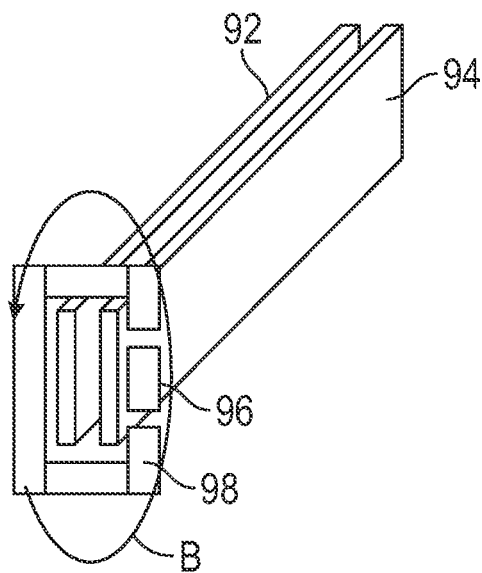
FIG. 10 depicts a pair of conductors configured to carry output currents from a dual output multilevel inverter, including a current sensor disposed proximate to the pair of conductors, in accordance with an exemplary embodiment.

FIG. 10 depicts an embodiment in which the current sensor includes a magnetic field detector 94 and a magnetic core 96. Current is similarly measured by detecting a combined magnetic field B, which is twice the strength of each magnetic field generated by each busbar.

Figure 11:
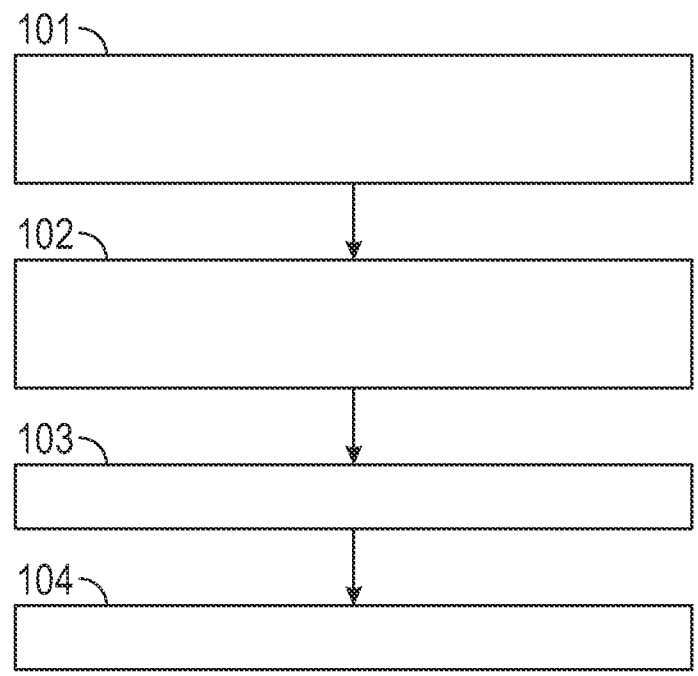
FIG. 11 is a flow diagram depicting aspects of a method of transferring power and controlling a conversion device, in accordance with an exemplary embodiment.

FIG. 11 illustrates embodiments of a method 100 of controlling a conversion device and controlling power transfer, such as transfer of power from a battery system to a motor or other AC load. Aspects of the method 100 may be performed by a processor or processors disposed in a vehicle, such as a controller connected to the conversion device, a vehicle controller or other suitable processing device or system.

The method 100 includes a number of steps or stages represented by blocks 101-104. The method 100 is not limited to the number or order of steps therein, as some steps represented by blocks 101-104 may be performed in a different order than that described below, or fewer than all of the steps may be performed.

The method 100 is described in conjunction with the vehicle 10 and the motor unit 20 for illustration purposes, but is not so limited. For example, the method may be used to control the motor unit 30 (in addition to or alternative to control of the motor unit 20) or any other suitable conversion device having one or more multilevel inverters. The method 100 can be used with any suitable conversion device or system, in automotive or other contexts.

At block 101, a vehicle such as the vehicle 10 is operated, and the motor 20 is engaged to produce torque and drive the vehicle 10. For example, the conversion device 24 includes a six-phase inversion circuit that includes three dual output multilevel inverters.

Each inverter 80a, 80b and 80c is controlled according to a switching sequence that is based on a modulation scheme. The modulation may be pulse width modulation (PWM) as discussed herein, or any other suitable scheme.

At block 102, a current sensor 84 is disposed in each inverter 80a, 80b and 80c (or positioned relative to phase outputs from each inverter). Each current sensor 84 samples current or magnetic field at selected points during a switching cycle.

If the current sensor is disposed within an inverter (e.g., as shown in FIGS. 2-7), the sampling points are selected such that current is sampled when an inverter is in the zero state.

Figure 12:
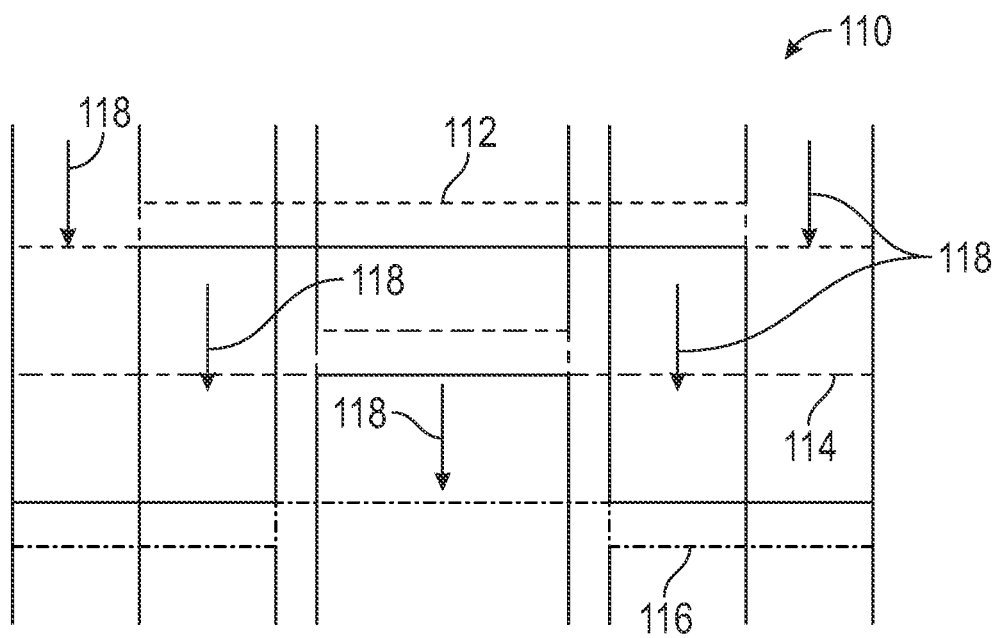
FIG. 12 includes a timing diagram representing sampling points performed during a switching cycle, in accordance with an exemplary embodiment.

FIG. 12 is a timing diagram 110 that illustrates an example of sampling points during a switching cycle. This example may be applicable to embodiments where the current sensor is disposed within each inverter (e.g., FIGS. 2-7).

The timing diagram depicts output current and voltage levels for an output from each inverter. Curve 112 represents portions of a switching cycle in which the A1 phase output (current a1) from the inverter 80a is positive (V is positive Vdc/2) and zero. Curve 114 represents portions of the switching cycle in which a B1 phase output (corresponding to current b1) is positive and zero, and curve 116 represents a C1 phase output from the inverter 80c (corresponding to current c1).

The timing diagram 110 also shows sampling points 118, which are temporal points at which each inverter is sampled. As shown, each current is sampled at a point when an inverter is in the zero state (zero voltage).

At block 103, the output current is estimated based on the current sensor samples. This may be performed by decoupling as discussed herein if the current sensor is a 2D PFD.

At block 104, various actions may be performed based on the estimations of current. Examples of actions include shutting down (e.g., if overcurrent or fault is detected), adjusting modulation parameters and others.

Figure 13:
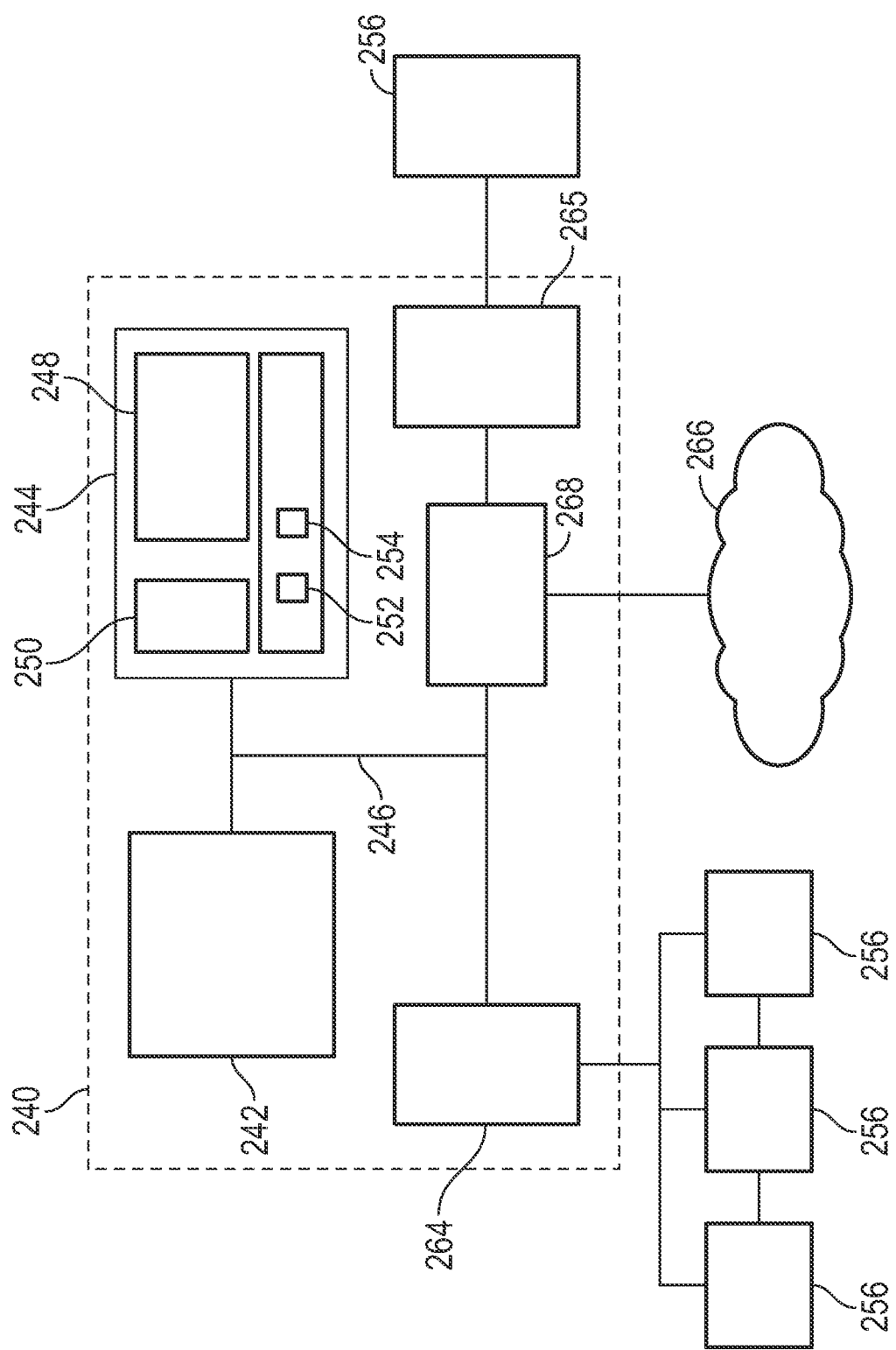
FIG. 13 depicts a computer system in accordance with an exemplary embodiment.

FIG. 13 illustrates aspects of an embodiment of a computer system 240 that can perform various aspects of embodiments described herein. The computer system 240 includes at least one processing device 242, which generally includes one or more processors for performing aspects of image acquisition and analysis methods described herein.

Components of the computer system 240 include the processing device 242 (such as one or more processors or processing units), a memory 244, and a bus 246 that couples various system components including the system memory 244 to the processing device 242. The system memory 244 can be a non-transitory computer-readable medium, and may include a variety of computer system readable media. Such media can be any available media that is accessible by the processing device 242, and includes both volatile and non-volatile media, and removable and non-removable media.

For example, the system memory 244 includes a non-volatile memory 248 such as a hard drive, and may also include a volatile memory 250, such as random access memory (RAM) and/or cache memory. The computer system 240 can further include other removable/non-removable, volatile/non-volatile computer system storage media.

The system memory 244 can include at least one program product having a set (i.e., at least one) of program modules that are configured to carry out functions of the embodiments described herein. For example, the system memory 244 stores various program modules that generally carry out the functions and/or methodologies of embodiments described herein. A module 252 may be included for performing functions related to sampling and current estimation, and a module 254 may be included to perform functions related to control of a conversion device as discussed herein. The system 240 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 242 can also communicate with one or more external devices 256 as a keyboard, a pointing device, and/or any devices (e.g., network card, modem, etc.) that enable the processing device 242 to communicate with one or more other computing devices. Communication with various devices can occur via Input/Output (I/O) interfaces 264 and 265.

The processing device 242 may also communicate with one or more networks 266 such as a local area network (LAN), a general wide area network (WAN), a bus network and/or a public network (e.g., the Internet) via a network adapter 268. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A conversion system, comprising:
 a conversion device including a multilevel inverter configured to generate two alternating current (AC) output currents;
 a current sensor configured to sample a magnetic fields produced by current through the multilevel inverter, or from the multilevel inverter, during a switching cycle; and
 a processor configured to estimate both of the two AC output currents based on the magnetic fields sampled by the current sensor, wherein the multilevel inverter is a diode clamped inverter having a first set of switches connected by a neutral branch to a second set of switches, and the current sensor is disposed at the neutral branch.

2. The conversion system of claim 1, wherein the current sensor is configured to sample the current during a switching cycle when zero voltage is output.

3. The conversion system of claim 1, wherein the current sensor is a two-dimensional magnetic field detector.

4. The conversion system of claim 1, wherein the first set of switches is connected by a first diode to the second set of switches, the multilevel inverter includes a third set of switches connected by a second diode to a fourth set of switches, and the current sensor is configured to simultaneously detect orthogonal magnetic fields due to a current flowing through the first diode and the second diode.

5. The conversion system of claim 1, wherein the multilevel inverter has a full bridge topology connecting a first set of switches to a second set of switches, the first set of switches connected to the second set of switches by the neutral branch, the neutral branch forming a bidirectional switch line including a conductor and a set of neutral branch switches.

6. The conversion system of claim 1, wherein the multilevel inverter includes a first phase branch including a first neutral branch that connects the set of first switches to the set of second switches, and a second phase branch including a second neutral branch that connects a third set of switches to a fourth set of switches, and the current sensor is disposed proximate to a crossing of the first neutral branch and the second neutral branch.

7. The conversion system of claim 5, wherein the current sensor is a two-dimensional magnetic field sensor disposed at an orthogonal crossing between a branch of the full bridge topology and one of: the bidirectional switch line and a direct current (DC) bus.

8. The conversion system of claim 1, wherein the multilevel inverter is connected to a first output conductor configured to carry a first output current and a second output conductor configured to carry a second output current, and the current sensor, the first output conductor and the second output conductor are configured so that the current sensor detects a first magnetic field generated by the first output current and a second magnetic field generated by the second output current.

9. A method of transferring electrical power, comprising:
receiving an input current from a direct current (DC) source at a conversion device including a multilevel inverter;
converting the input current by the multilevel inverter to generate two alternating current (AC) output currents, wherein the converting includes performing a series of switching cycles;
sampling a magnetic fields produced by current through the multilevel inverter, or from the multilevel inverter, during a switching cycle by a single current sensor; and estimating both of the two AC output currents based on the magnetic fields sampled by the single current sensor, wherein the multilevel inverter is a diode clamped inverter having a first set of switches connected by a neutral branch to a second set of switches, and the single current sensor is disposed at the neutral branch.

10. The method of claim 9, wherein the sampling is performed during the switching cycle when zero voltage is output.

11. The method of claim 9, wherein the first set of switches is connected by a first diode to the second set of switches, the multilevel inverter includes a third set of switches connected by a second diode to a fourth set of switches, and the single current sensor simultaneously detects orthogonal magnetic fields due to current flowing through the first diode and the second diode.

12. The method of claim 11, wherein the estimating includes decoupling the orthogonal magnetic fields.

13. The method of claim 9, wherein the multilevel inverter has a full bridge topology connecting a first set of switches to a second set of switches, the first set of switches connected to the second set of switches by the neutral branch, the neutral branch forming a bidirectional switch line including a conductor and a set of neutral branch switches.

14. The method of claim 13, wherein the single current sensor is disposed at the bidirectional switch line, and the sampling is performed during the switching cycle when a current is flowing through the bidirectional switch line.

15. The method of claim 13, wherein the single current sensor is a two-dimensional magnetic field sensor disposed at an orthogonal crossing between a branch of the full bridge topology and one of: the bidirectional switch line and a DC bus, and the sampling is performed when a current is flowing through the orthogonal crossing.

16. The method of claim 9, wherein the multilevel inverter is connected to a first output conductor configured to carry a first output current and a second output conductor configured to carry a second output current, and the sampling includes detecting a first magnetic field generated by the first output current and a second magnetic field generated by the second output current.

17. A vehicle system, comprising:
a battery system;
a conversion device connected to the battery system and including a multi-phase inverter module, the multi-phase inverter module including a multilevel inverter configured to output two alternating current (AC) output currents; and
a processor configured to perform a method including:
converting an input current by the multilevel inverter to generate the two AC output currents, wherein the converting includes performing a series of switching cycles;
sampling a magnetic fields produced by current through the multilevel inverter, or from the multilevel inverter, during a switching cycle by a single current sensor; and estimating both of the two AC output currents based on the magnetic fields sampled-by the single current sensor, wherein the multilevel inverter is a diode clamped inverter having a first set of switches connected by a neutral branch to a second set of switches, and the current sensor is disposed at the neutral branch.

18. The vehicle system of claim 17, wherein the first set of switches is connected by a first diode to the second set of switches, the multilevel inverter includes a third set of switches connected by a second diode to a fourth set of switches, and the single current sensor simultaneously detects orthogonal magnetic fields due to current flowing through the first diode and the second diode.

19. The vehicle system of claim 17, wherein the multilevel inverter has a full bridge topology connecting a first set of switches to a second set of switches, the first set of switches connected to the second set of switches by the neutral branch, the neutral branch forming a bidirectional switch line including a conductor and a set of neutral branch switches, the single current sensor is disposed at the bidirectional switch line, and the sampling is performed during the switching cycle when a current is flowing through the bidirectional switch line.

20. The vehicle system of claim 17, wherein the multilevel inverter is connected to a first output conductor configured to carry a first output current and a second output conductor configured to carry a second output current, and the sampling includes detecting a first magnetic field generated by the first output current and a second magnetic field generated by the second output current.

* * * * *